(12) United States Patent
Maxwell et al.

(10) Patent No.: US 7,773,571 B1
(45) Date of Patent: Aug. 10, 2010

(54) TRANSFER OF POLICY AND CHARGING RULES DURING MIP HANDOVER

(75) Inventors: Stewart Hodde Maxwell, Dallas, TX (US); Saso Stojanovski, Paris (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 681 days.

(21) Appl. No.: 11/701,657

(22) Filed: Feb. 2, 2007

Related U.S. Application Data

(60) Provisional application No. 60/764,929, filed on Feb. 3, 2006.

(51) Int. Cl.
*H04W 31/2001* (2006.01)
*H04M 6/2002* (2006.01)
(52) U.S. Cl. .................. 370/338; 370/339; 370/342; 370/343; 370/351; 370/429
(58) Field of Classification Search ............... 455/406, 455/407, 408, 436, 410, 411; 370/349, 401, 370/338, 329; 705/40
See application file for complete search history.

(56) References Cited

U.S. PATENT DOCUMENTS

| | | | | |
|---|---|---|---|---|
| 6,804,221 | B1 * | 10/2004 | Magret et al. ............... | 370/338 |
| 7,548,743 | B2 | 6/2009 | Cai et al. | |
| 2002/0075844 | A1 * | 6/2002 | Hagen ......................... | 370/351 |
| 2002/0188562 | A1 * | 12/2002 | Igarashi et al. ............... | 705/40 |
| 2003/0026241 | A1 * | 2/2003 | Ono et al. ................... | 370/349 |
| 2003/0235175 | A1 * | 12/2003 | Naghian et al. ............. | 370/338 |
| 2004/0018829 | A1 * | 1/2004 | Raman et al. ............... | 455/406 |
| 2004/0102182 | A1 * | 5/2004 | Reith et al. ................. | 455/410 |
| 2004/0246933 | A1 * | 12/2004 | Valko et al. ................. | 370/338 |
| 2006/0002422 | A1 | 1/2006 | Hurtta | |
| 2006/0008063 | A1 | 1/2006 | Harnesk et al. | |

FOREIGN PATENT DOCUMENTS

WO     WO 03/040898 A1      5/2003

(Continued)

OTHER PUBLICATIONS

3rd Generation Partnership Project; Technical Specification Group Services and System Aspects; Telecommunication management; Charging management; Charging architecture and principles (Release 6); 3GPP TS 32.240 V6.0.0 (Sep. 2004).

(Continued)

*Primary Examiner*—Kent Chang
*Assistant Examiner*—Farley Balan
(74) *Attorney, Agent, or Firm*—D. Scott Hemingway; Hemingway & Hansen, LLP (57) ABSTRACT

The invention discloses a new protocol to minimize data loss, reduce overhead transmissions on the system, reduce time delays and signal interruption during a handover in a Mobile IP system. Prior art Mobile IP systems transfer policy and charging rules for a particular mobile user device from a server to a gateway after the handover occurs. The invention allows for the transfer of the policy and charging rules during the handover procedure so that the system does not need to wait on a subsequent transmission of the policy and charging rules in order to process the transmissions sent by or to the mobile user, which results in minimized data loss, reduced overhead, and reduced time delays and signal interruption.

20 Claims, 3 Drawing Sheets

FOREIGN PATENT DOCUMENTS

| | | |
|---|---|---|
| WO | WO 2004/004301 A1 | 1/2004 |
| WO | WO 2005/050917 A2 | 6/2005 |
| WO | WO 2007/079682 A1 | 7/2007 |

OTHER PUBLICATIONS

3rd Generation Partnership Project; Technical Specification Group Service and System Aspects; Telecommunication management; Charging management; Diameter charging applications (Release 6); 3GPP TS 32.299 V6.0.0 (Sep. 2004).

3.sup.rd Generation Partnership Project; Technical Specification Group Services and Systems Aspects; Telecommunication manqagement; Charging management; Charging principles (Release 5); 3GPP TS 32.200 v5.7.0 (Jun. 2004).

3.sup.rd Generation Partnership Project; Technical Specification Group Service and System Aspects; Telecommunication management; Online Charging System (CS): Applications and Interfaces (Releases 6); 3GPP TS 32.296 v.1.8.1 (Sep. 2004).

3.sup.rd Generation Partnership Project; Technical Specification Group Services and System Aspects; IP Multimedia Subsystem (IMS); Stage 2 (Release 6); 3GPP TS 23.228 v6.4.1 (Jan. 2004).

* cited by examiner

TRANSFER OF POLICY AND CHARGING RULES DURING MIP HANDOVER

RELATED APPLICATION DATA

This application is related to U.S. Provisional Patent Application Ser. No. 60/764,929 filed on Feb. 3, 2006, and priority is claimed for this earlier filing under 35U.S.C. §120.The Provisional Patent Application is also incorporated by reference into this utility patent application.

TECHNICAL FIELD OF THE INVENTION

An improved method and system for transferring policy and charging rules during an MIP handover.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

INTERNET PROTOCOLS

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

THE IP-BASED MOBILITY SYSTEM

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The Internet protocols were originally developed with an assumption that Internet users' communication devices would be connected to a single, fixed network. With the advent of cellular wireless communication systems using mobile communication devices (mobile units), the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a User Equipment or mobile station. Typically, a mobile station maintains connectivity to its home network while operating on a visited network. The mobile station will remain associated with its home network for IP addressing purposes and will have information routed to it by routers located on the home and visited networks.

In an IP-based mobile communication system, the mobile communication device (e.g. cellular phone, pager, computer, etc.) can be called User Equipment. Typically, User Equipment maintains connectivity to its home network through a foreign network. The User Equipment will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

PACKET-BASED COMMUNICATION SYSTEMS

Telecommunication networks are complex networks used to establish connections between two or more telecommunication devices. Frequently, the devices involved with a telecommunications call or connection are referred to as the originating device and the terminating device. The user typically enters an identifying number into the originating device of the terminating device to which a call is to be placed. The network responds to entry of the identifying number of the terminating device and performs a call setup procedure that establishes, among other things, a connection between the originating device and the terminating device using IP addressing. Call data, voice or multimedia, is then routed between the two devices according the IP addressing assigned to each device.

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

Voice and data transmitted according to the IP packet standard is the evolving and most current communication protocol for cellular telephone communication. With this migration to the IP standard and miniaturization of computer chip technology with dramatic increases in clock speeds, computational power, and memory storage has come increasingly sophisticated services such as email access, streaming video and audio data transfers, instant messaging, text messaging, multimedia applications, picture messaging, Internet website access, e-commerce applications, games and other services. Cell phones have accordingly evolved from relatively crude devices limited to telephony communication to near mini-computers with operating features and capabilities equal to if not superior to early personal computers.

A typical cellular communication system is comprised of multiple cell sites, each covering an intended geographic region. Each of the cell sites can be assigned an address for routing information packets, and each User Equipment can be assigned an address for their physical connectivity to the cell site.

Each cell site supports voice and data communication to the linked User Equipment present within that geographic area. A wireless communication link is maintained by a transceiver at or very near the center of the cellular coverage area. The transceiver is coupled to a base station transceiver substation which is coupled to a base station controller, with controls the packet transmissions within the cell site area. The base station controller is also coupled to a mobile switching center, which routes calls handled by the base station controller and base transceiver station to a public switched telephone network or a packet data service node interface with the Internet. The gateway described herein is equivalent to the base station controller and packet data service node in a CDMA network.

Information packets on the communication system are processed by the base station controller for transmission to the public switched telephone network or the Internet. The base station controller processes the information packets for transmission to the public switched telephone network, the Internet, or User Equipment ("UE"). As User Equipment moves across cellular boundaries, it changes its connectivity and its connectivity address.

Routers on the communication network have to be updated with this new connectivity address so that information packet can continue to be properly routed. The address used for routing can be a single IP address, a combination of an IP address and a connectivity address, or some other similar addressing scheme providing packet routing data on the communication network corresponding to the physical connectivity of the User Equipment.

CDMA SYSTEMS

Code Division Multiple Access (CDMA) is an evolving generation communication system standard for wireless communication systems that can transmit multimedia services using the packet-based Internet protocol. These CDMA mobile communication systems support multimedia telecommunication services delivering voice (VoIP) and data, to include pictures, audio, video, streaming video, messaging, and other multimedia information over mobile wireless connections. As used herein, "CDMA" encompasses code division multiple access technologies being developed by Third Generation Partnership Project ("3GPP") and the Third Generation Partnership Project 2 ("3GPP2") bodies, as well as other CDMA technologies.

As the capability of the various communication standards have improved, there has been an increasing need for high-speed transmissions and increased user capacity. New CDMA protocols and packet air interface have been developed that offer improvements over earlier CDMA systems by implementing high-speed shared-traffic packet data channels on the forward air-link connection as well as other improvements in data signal flow. Other standards are evolving that also make use of the shared packet channel and multiplex packet communication for high-speed data and voice communication.

On the CDMA standard, User Equipment or Access Terminals (ATs), roam within and across cellular communication sites. Each of the cells possesses one or more transceivers coupled to a Base Transceiver Station (BTS) onto the communication network. The BTSs are in turn coupled to an Access Network.

UE can be physically located anywhere on the network or sub-network, and its routing address data will change and require updating on other nodes. As UE migrates across cellular borders or across network boundaries, its connection to its Home Network changes.

Wireless IP networks handle the mobile nature of UE with handover procedures designed to update the communication network and sub-network with the location of the User Equipment for packet routing purposes. Because User Equipment can move within sub-networks and between networks, handover procedures are needed to insure that packets are continually routed without delays or interruption to the recipient UE as it moves from one network to another or from one sub-network to another.

As the CDMA standards evolve, newer methods and enhancements to transmitting packets on the network are being developed and deployed. There is a currently a need for an improved handover method that is also compliant with the standardized protocol interface between the base station and packet-switching equipment (PDSN, PCF), as well as other standards.

SUMMARY OF THE INVENTION

The invention discloses a new protocol to minimize data loss, reduce overhead transmissions on the system, reduce time delays and signal interruption during a handover in a Mobile IP system. Current Mobile IP systems transfer policy and charging rules for a particular mobile user device from a server to a gateway after the handover occurs. Waiting on the transfer of the policy and charging rules after a handover, however, can cause an interruption in the signal flow to and from the mobile user.

The invention allows for the transfer of the policy and charging rules during the handover procedure so that the system does not need to wait on a subsequent transmission of the policy and charging rules in order to process the transmissions sent by or to the mobile user, which results in minimized data loss, reduced overhead, and reduced time delays and signal interruption. A confirmation transmission of the policy and charging rules for a UE can be sent after the handover occurs. This invention will result in less dropped packets and reduced noticeable interruptions in data sessions with real time characteristics, such as Voice over IP applications.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
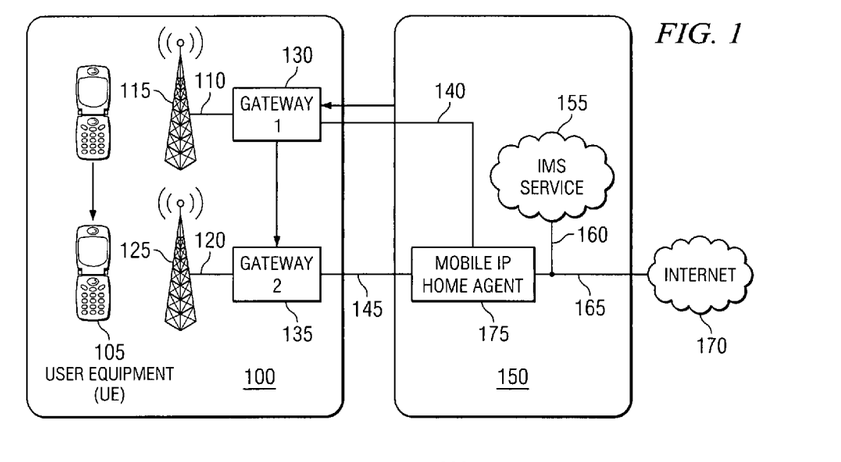
FIG. 1 is a schematic diagram of the functional elements of a wireless communication network based on an implementing architecture for a CDMA system.

FIG. 1 shows the typical IP-based cellular communication system components utilizing the invention. Referring to FIG. 1, gateway 1 130 and base transceiver station 115 are coupled by connector 110. This cell site initially supports the wireless communication with User Equipment 105.

As the User Equipment 105 moves through the Visited Network 100, the User Equipment needs to be handed over to a new cellular site, which included gateway 2 135 coupled to a base transceiver station 125 via connector 120. Gateway 1 130 is coupled to gateway 2 and separately connected to Home Agent 175 via connector 140. Gateway 2 135 is coupled to Home Agent 175 via connector 145. Gateway 1 130 and gateway 2 135 are equivalent to the base station controller and packet data service node in a CDMA network.

The Home Agent 175 located on Home Network 150, which is coupled to the Internet 170 via connector 165. The Home Agent 175 is also connected to IMS Service 155 via connector 160.

Policy and charging rules define, per subscriber, what types of traffic are allowed, what Quality of Service is provided, and how much it costs the subscriber to send and receive transmissions. When the UE 105 initially couples to the gateway 1 130, the Home Network 150 sends policy and charging rules to the gateway 1 130. That gateway 1 130 enforces that policy and charging rules on behalf of the Home Network 150 while the UE 105 is associated with gateway 1 130 on the Visited Network 100.

When the UE 105 moves to gateway 2 135, policy and charging rules are needed on gateway 2 135 to enforce the rules for the transmission of packets to and from the UE 105. In the prior art system, the policy and charging rules are transmitted to gateway 2 135 after the handover of the UE occurs to gateway 2 135. The transmission of voice packets and data packets may be blocked until policy and charging rules are obtained on gateway 2 135, even if it only takes a short time period to receive those rules after the handover of the UE 105 to gateway 2 135. The present invention allows the policy and charging rules to be placed on the destination gateway 2 135 during the handover process to avoid interruption of the voice or data connection. By receiving policy and charging rules during the handover routine, the transmission of data and voice packets is not blocked waiting for the receipt of the policy and charging rules. The invention is particularly useful in avoiding interruption of signal in transmission types that approximate real-time criteria, such as VoIP transmissions.

Figure 2:
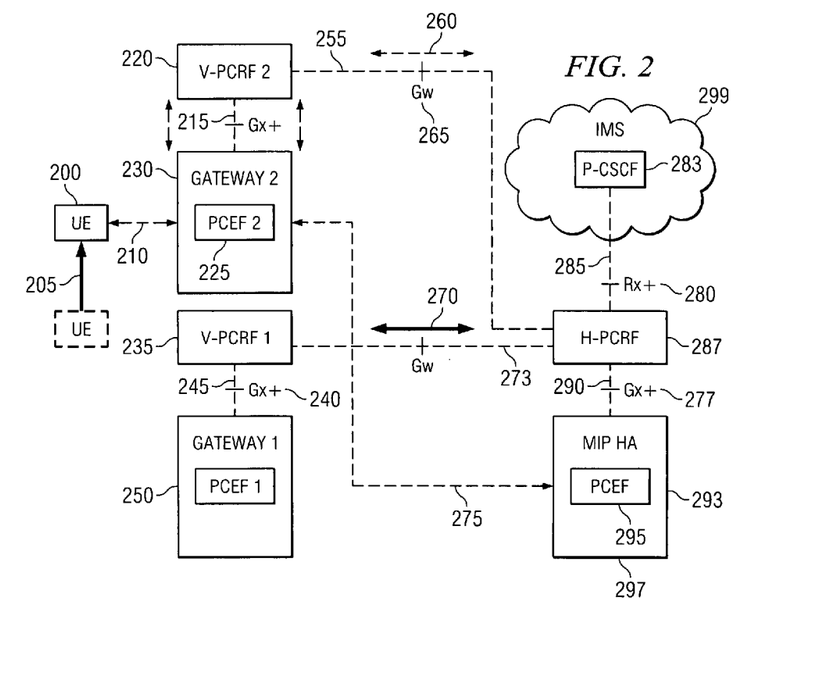
FIG. 2 is a prior art system showing the high level overview of architecture of the handover of UE.

As shown in FIG. 2, the high level architecture is shown for a system where there is a proxy P-CSCF 283 in the IMS system 299. The IMS 299 is coupled to Home Network policy and charging rules functions H-PCRF 287 through connector 285 and Rx 280. The H-PCRF 287 serves as an anchor point for policy and charging control purposes.

The H-PCRF 287 is coupled to the Mobile IP Home Agent 293 via connector 290 and Gx 277. The MIP HA 293 possesses the policy and charging enforcement function PCEF 295.

The Visited policy and charging rules function 1 235 (V-PCRF 1) is coupled to the H-PCRF 287 through connection 273 and Gw on line 273. The V-PCRF 1 235 is coupled to gateway 1 250 via connector 245 and Gx 240. Gateway 1 250 includes policy and charging enforcement function 1 thereon. When UE 200 is associated with gateway 1 250, the policy and charging rules are transmitted to the gateway 1 by the H-PCRF 287.

The Visited policy and charging rules function 2 220 (V-PCRF 2) is coupled to the H-PCRF 287 through connection 255 and Gw 265 on line 255. The V-PCRF2 220 is coupled to gateway 2 230 via connector 215 and Gx on connector 215. Gateway 2 230 includes policy and charging enforcement function PCEF 2 225 thereon. When the handover of UE 200 is initiated, UE leaves the gateway 1 service area and proceeds to gateway 2. Sometimes, a bidirectional tunnel is established temporarily for forwarding of packets to the UE 200 when it moves to the new gateway 2.

After UE 200 arrives at the gateway 2 230 service area, the UE receives a new care-of address from the gateway 2 230. It is possible that gateway 1 250 may tunnel packets to gateway 2 230. If not, it is also possible that the gateway 1 250 will buffer packets, but these packets may have to be discarded if no tunnel is established. The UE 200 registers its new care-of address with the MIP Home Agent 297, so the packets addressed to UE 200 may be forwarded to gateway 2 230 for transmission to UE 200. Any temporary bi-directional tunnel can be removed at this point, and data and voice packets can be transmitted and received by UE 200 at this point through its gateway 2 connection.

Looking at FIG. 2, the policy and charging rules function does not possess the policy and charging rules for UE when the handover occurs or when the care-of address gets registered, and the gateway 230 may refuse to transmit data and voice packets addressed to UE or sent from UE without the appropriate policy and charging rules. The delays in receiving the most appropriate rules for the policy and charging enforcement function 295 may result in delays or lost data and voice packets.

The gateway 2 230 notifies the policy and charging rules function V-PCRF 2 220 about the presence of UE 200 on the gateway 2 230, and V-PCRF 2 220 retrieves policy and charging rules information for the UE 200 from H-PCRF 287 and forwards the policy and charging information to gateway 2 230 for operation on data packets transmitted and received by UE 200. While waiting for the receipt of the rules, there is a possibility that data packets will be lost and discarded, which will result in an interruption of service until the policy and charging information is received and applied to the system. Delay sensitive devices and services (e.g. VoIP) are especially susceptible to these interruptions of packet transmissions.

In summary, the prior art supports the system where the UE 200 receives a new care-of address from gateway 2. Then, the policy and charging rules are transferred to the gateway 2 by the H-PCRF 287 after that address is established. After handover but before the policy and charging rules are transferred to the new gateway 2, the transmission of voice and data to UE 200 can be interrupted or delayed.

The H-PCRF 287 provides an anchor point for policy and charging rules purposes. UE network access identifier (NAI) is used for PCRF addressing V-PCRF 235 to discover the H-PCRF 287. Although the scenario shown in the application shows a roaming function, the concept is applicable and useful in non-roaming scenarios.

Figure 3:
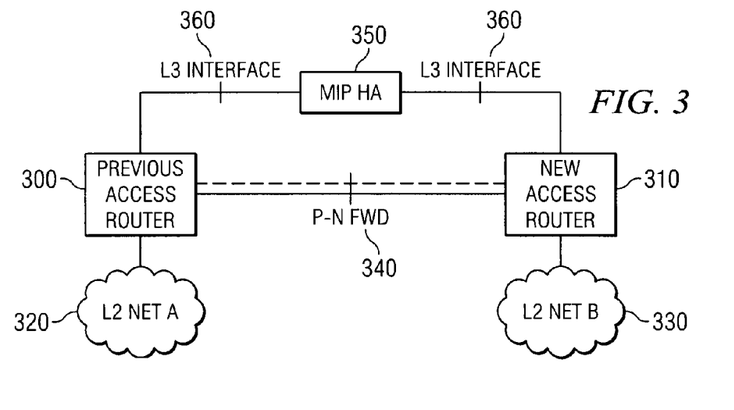
FIG. 3 is a schematic diagram of the functional elements of a wireless communication network based on an implementing architecture for a CDMA system.

The temporary tunnel can be seen in FIG. 3, where the Mobile IP Home Agent 350 is coupled to the Previous Access Router 300 and New Access Router 310 via connector 360. Connector 360 is also known as an L3 interface. The Previous Access Router 300 is coupled to the New Access Router 310 via tunnel 340. Previous Access Router 300 is equivalent to gateway 1 250 shown in a prior figure. Likewise, New Access Router 310 is equivalent to gateway 2 230 shown in a prior figure. When the UE moves from L2 Net A 320 to L2 Net B 330, the UE registers its new care-of address with the Mobile IP Home Agrent 350 through New Access Router 310. Until the policy and charging rules can be transferred to the New Access Router 310, the tunnel 340 permits a forwarding of data and voice packets, but there is not complete reliability in the use of the tunnel.

Figure 4:
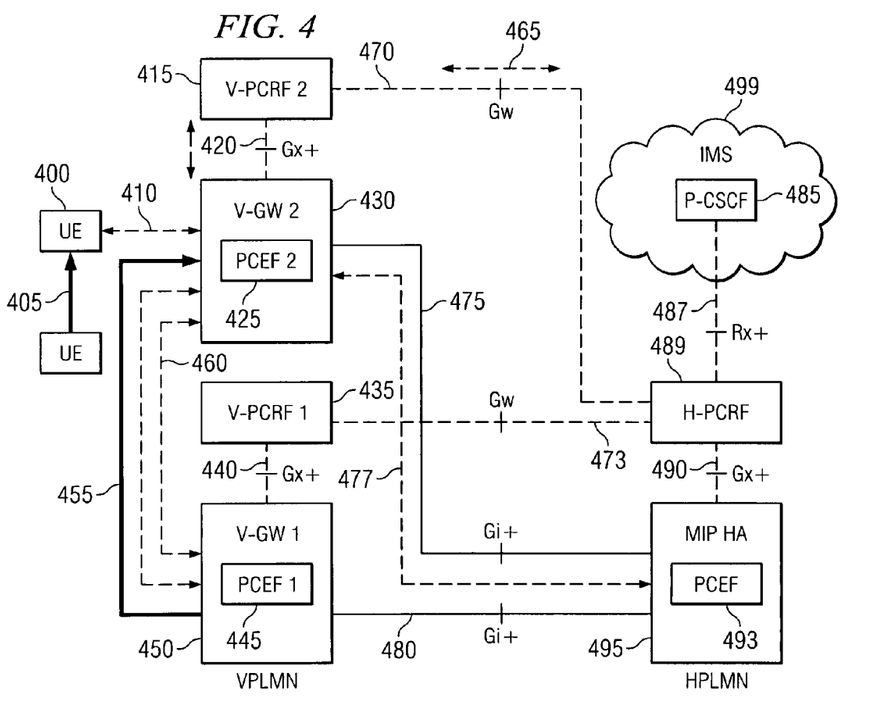
FIG. 4 is the system showing the high level overview of architecture of the handover of UE using the present invention.

As shown in FIG. 4, the high level architecture of the present invention is shown for a system where the proxy CSCF 485 in the IMS system 499. The IMS 499 is coupled to Home Network policy and charging rules functions H-PCRF 489 through connector 487 and Rx thereon. The H-PCRF 489 serves as an anchor point for policy and charging control purposes.

The H-PCRF 489 is coupled to the Mobile IP Home Agent 495 via connector 490 and Gx thereon. The MIP HA 495 possesses the policy and charging enforcement function PCEF 493.

The Visited policy and charging rules function 1 435 (V-PCRF 1) is coupled to the H-PCRF 489 through connection 473 and Gw on line 473. The V-PCRF 1 435 is coupled to gateway 1 450 via connector 440 and Gx thereon. Gateway 1 450 includes policy and charging enforcement function PCEF 1 445 thereon. When UE 400 is associated with gateway 1 450, the policy and charging rules are transmitted to the gateway 1 450 by the H-PCRF 489. The policy & enforcement rules functions are coupled to the gateway 1 450 from the MIP Home Agent 495 via connector 480 and Gi connected thereon.

The Visited policy and charging rules function 2 415 (V-PCRF 2) is coupled to the H-PCRF 489 through connection 470 and Gw thereon. The V-PCRF 2 415 is coupled to gateway 2 430 via connector 420 and Gx on connector 420. Gateway 2 430 includes policy and charging enforcement function PCEF 2 425 thereon.

When the handover according to the present invention is initiated, UE 400 leaves the gateway 1 450 service area and proceeds to gateway 2 430. Gateway 1 450 initiates a fast handover of UE 400 to gateway 2 430, and during that handover, gateway 1 450 sends the policy and charging information for the UE 400 to gateway 2 430 as part of the exchange of information 455 between the gateways in the handover procedure. Also as part of the exchange of rules information and other information, a tunnel is set up between gateway 1 and gateway 2 to forward packets.

UE 400 receives its care-of address from the gateway 2 430. It is possible that gateway 1 450 may tunnel packets to gateway 2 430. If not, it is also possible that the gateway 1 450 will buffer packets, but these packets may have to be discarded without an existing tunnel. The UE 400 registers its new care-of address with the MIP Home Agent 495, so the packets addressed to UE 400 may be forwarded to gateway 2 for transmission to UE 400. Any temporary bi-directional tunnel can be removed at this point, and data and voice packets can be transmitted and received by UE 400 at this point through its gateway 2 connection.

Looking at FIG. 4, because the policy and charging rules functions are initially transferred to the gateway 2 during the initial exchange of information during the handover process, there is no delay or interruption in the data and voice transmissions sent by or to gateway 2 430 for UE 400. The gateway 2 430 notifies the V-PCRF 2 415 that the UE 400 is present on gateway 2 430, and the V-PCRF 2 415 retrieves the latest policy and rules information from the H-PCRF 489 via connection 470. The latest policy and charging rules information received from PCRF 489 confirms the prior information sent to gateway 2 430 if the same, and if not, the confirmation policy and charging rules received from H-PCRF 489 takes precedence over the prior policy and charging rules information received from gateway 1 450 during the fast handover exchange of information.

In this manner, there is no delay in receiving the policy and charging rules information to be applied to the UE 400, and there should not be any lost data or voice packets caused by delays in the receipt of the policy and charging rules. The new gateway will have policy and charging information for UE 400, as initially transmitted to the new gateway during the handover procedure, which can be confirmed later by the receipt of policy and charging information from H-PCRF 489.

Figure 5:
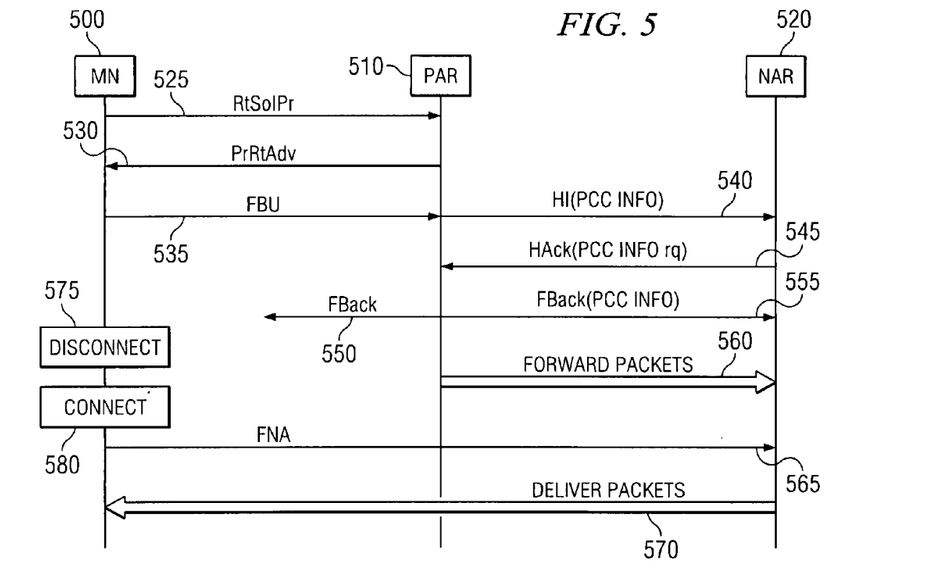
FIG. 5 is a message flow for handover for a predictive handover.

In FIG. 5, a message flow is shown for a predictive fast handover between the Mobile Node 500, the Previous Access Router 510 and the next Access Router 520. The Router Solicitation Proxy Advertisement 525 message is sent from Mobile Node 500 to Previous Access Router 510, and the Proxy Router Advertisement 530 is sent back to the Mobile Node 500. The Fast Binding Update 535 message is sent from the Mobile Node 500 to the Previous Access Router 510, and the Handover Initiation 540 message is sent to the Next Access Router 520. The Handover Initiation Message 540 may contain the policy and charging rules information (PCC) set forth therein. A tunnel can be set up between the Prior Access Router 510 and the Next Access Router 520 to assist with the transfer of data and voice packets.

The Handover Initiation Acknowledgement message 545 is sent back from the Next Access Router 520 to the Previous Access Router 510. In that Acknowledgement message 545, there is a request for a transmission of the latest policy and charging rules information if the policy and charging rules information (PCC) was not sent in the Handover Initiation Message 540. The Previous Access Router 510 sends out Fast Binding Acknowledgement messages 555 and 550 to the Next Access Router and the Mobile Node, respectively. The latest policy and charging rules are transmitted in message 555 back to the Next Access Router 520 if the policy and charging rules information (PCC) was not sent in the Handover Initiation Message 540.

The Mobile Node 500 disconnects 575 the connection to the Previous Access Router 510, and packets are forwarded to the Next Access Router at 560 via a tunnel. The Next Access Router 520 is connected 580 to the Mobile Node 500, and the Fast Neighbor Advertisement FNA 565 is sent from Mobile Node 500 to Next Access Router 520. Packets are then delivered without the need for a tunnel 560, and with the latest policy and charging information, at 570 according to the teachings of the present invention using a predictive handover protocol.

Figure 6:
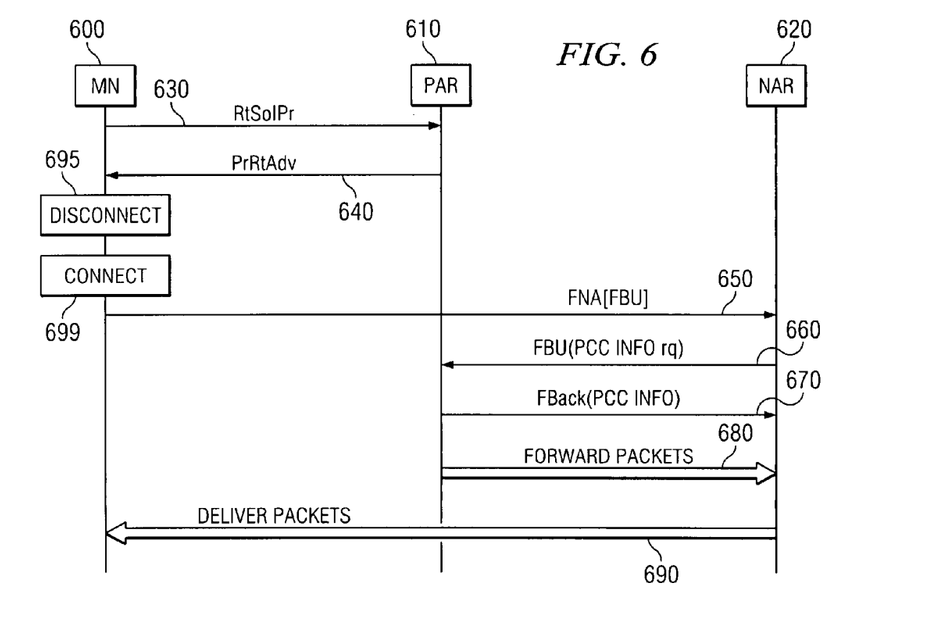
FIG. 6 is a message flow for handover for a reactive handover.

In FIG. 6, a message flow is shown for a reactive handover between the Mobile Node 600, the Previous Access Router 610 and the next Access Router 620. The Router Solicitation Proxy Advertisement 630 message is sent from Mobile Node 600 to Previous Access Router 610, and the Proxy Router Advertisement 640 is sent back to the Mobile Node 600.

The Mobile Node 600 is disconnected 695 from the Previous Access Router 610 and connected 699 to the Next Access Router 620 through the Fast Neighbor Advertisement 650. The Fast Binding Update message 660 is sent from the Next Access Router 620 to the Prior Access Router 610 with a request for the policy and charging rules, and the Prior Access Router 610 responds with the policy and charging rules in the Fast Binding Acknowledgement message 670 sent from the Previous Access Router 610 to the Next Access Router 620. Packets are then delivered to the Next Access Router 620, and packets are delivered 695 to the Mobile Node 600, with the latest policy and charging information.

While the invention has been particularly shown and described with respect to preferred embodiments, it will be readily understood that minor changes in the details of the invention may be made without departing from the spirit of the invention. Having described the invention,

We claim:

1. A method of smoothly changing connections to a home agent for user equipment on a packet-based communication system comprising the steps of:
    preparing a source gateway to handover its connection to user equipment to a destination gateway;
    providing handover information for user equipment from said source gateway to a destination gateway;
    providing said destination gateway with policy and charging information for said user equipment with said handover information provided by said source gateway;
    transferring the connection of the user equipment from said source gateway to said destination gateway;
    establishing a new connection for the user equipment to its home network through the destination gateway by establishing a connection of the user equipment with the destination gateway and the home network for supporting the user equipment; and,
    using the policy and charging rules provided to the destination gateway during the handover procedure to process data packets associated with user equipment until any different policy and charging information is received by the destination gateway.

2. The method of smoothly changing connections to a home agent of claim 1 wherein the policy and charging information are confirmed by subsequent communications with the router holding that information and associated with the home network.

3. The method of smoothly changing connections to a home agent of claim 1 further comprising the steps of:
    transmitting a request for policy and charging information for the user equipment to a router possessing said information and associated with the home network, and
    transmitting the most appropriate policy and charging information to the destination gateway to confirm prior policy and charging information received from source gateway during handover procedures.

4. The method of smoothly changing connections to a home agent of claim 3 wherein the policy and charging information transmitted from the router takes precedence over any previous policy and charging information transmitted to the destination gateway from the source gateway.

5. The method of smoothly changing connections to a home agent of claim 1 further comprising the steps of:
    establishing a tunnel between the source and destination gateways prior to establishing said new connection for the forwarding transmission of packets to the destination gateway from the source gateway.

6. The method of smoothly changing connections to a home agent of claim 5 further comprising the steps of:
    disconnecting said tunnel between the source gateway and the destination gateway after the user equipment has established its connection to said home agent through the destination gateway.

7. A method of smoothly changing connections to a home agent for user equipment on a packet-based communication system comprising the steps of:
    preparing a source gateway to handover its connection to user equipment to a destination gateway;
    providing handover information for user equipment from said source gateway to a destination gateway;
    providing said destination gateway with policy and charging information for said user equipment with said handover information provided by said source gateway;
    transferring the connection of the user equipment from, said source gateway to said destination gateway;
    establishing a tunnel between the source and destination gateways for forwarding transmission of packets to the destination gateway;
    establishing a new connection for the user equipment to its home network through the destination gateway by establishing a connection of the user equipment with the destination gateway and the home network for supporting the user equipment;
    using the policy and charging information provided to the destination gateway during the handover procedure to process data packets associated with user equipment until any different policy and charging information is received by the destination gateway; and
    disconnecting said tunnel between the source and destination gateways.

8. The method of smoothly changing connections to a home agent of claim 7 wherein the policy and charging information are confirmed by subsequent communications with the router holding that information and associated with the home network.

9. The method of smoothly changing connections to a home agent of claim 7 further comprising the steps of:
    transmitting a request for policy and charging information for the user equipment to a router possessing said information and associated with the home network, and
    transmitting the most appropriate policy and charging information to the destination gateway to confirm prior policy and charging information received from source gateway during handover procedures.

10. The method of smoothly changing connections to a home agent of claim 9 wherein the policy and charging information transmitted from the router takes precedence over any previous policy and charging information transmitted to the destination gateway from the source gateway.

11. A method of smoothly changing connections to a home agent for user equipment on a packet-based communication system comprising the steps of:
    preparing a source gateway to handover its connection to user equipment to a destination gateway;
    providing handover information for user equipment from said source gateway to a destination gateway;
    providing said destination gateway with policy and charging information for said user equipment with said handover information provided by said source gateway;
    transferring the connection of the user equipment from said source gateway to said destination gateway;
    establishing a new connection for the user equipment to its home network through the destination gateway by establishing a connection the user equipment, destination gateway and the home network for supporting the user equipment; and, using the policy and charging rules provided to the destination gateway during the handover procedure to process data packets associated with user equipment.

12. The method of smoothly changing connections to a home agent of claim 11 wherein the policy and charging information are confirmed by subsequent communications with the router holding that information and associated with the home network.

13. The method of smoothly changing connections to a home agent of claim 11 further compressing the steps of:
    transmitting a request for policy and charging information for the user equipment to a router possessing said information and associated with the home network, and
    transmitting the policy and charging information to the destination gateway to confirm prior policy and charging information received from source gateway during handover procedures.

14. The method of smoothly changing connections to a home agent of claim 13 wherein the policy and charging information transmitted from the router takes precedence over any previous policy and charging information transmitted to the destination gateway from the source gateway.

15. The method of smoothly changing connections to a home agent of claim 11 further comprising the steps of:
    establishing a tunnel between the source and destination gateways prior to establishing said new connection for the forwarding transmission of packets to the destination gateway from the source gateway.

16. The method of smoothly changing connections to a home agent of claim 15 further comprising the steps of:
    disconnecting said tunnel between the source gateway and the destination gateway after the user equipment has established its connection to said home agent through the destination gateway.

17. The method of smoothly changing connections to a home agent of claim 16 wherein the policy and charging information are confirmed by subsequent communications with the router holding that information and associated with the home network.

18. The method of smoothly changing connections to a home agent of claim 16 further compressing the steps of:
    transmitting a request for policy and charging information for the user equipment to a router possessing said information and associated with the home network, and
    transmitting the policy and charging information to the destination gateway to confirm prior policy and charging information received from source gateway during handover procedures.

19. The method of smoothly changing connections to a home agent of claim 18 wherein the policy and charging information transmitted from the router takes precedence over any previous policy and charging information transmitted to the destination gateway from the source gateway.

20. The method of smoothly changing connections to a home agent of claim 11 wherein the system is a CDMA-based system.

* * * * *